March 12, 1946.   S. A. BALLARD   2,396,486
PARAFFIN ALKYLATION PROCESS
Filed Sept. 5, 1940
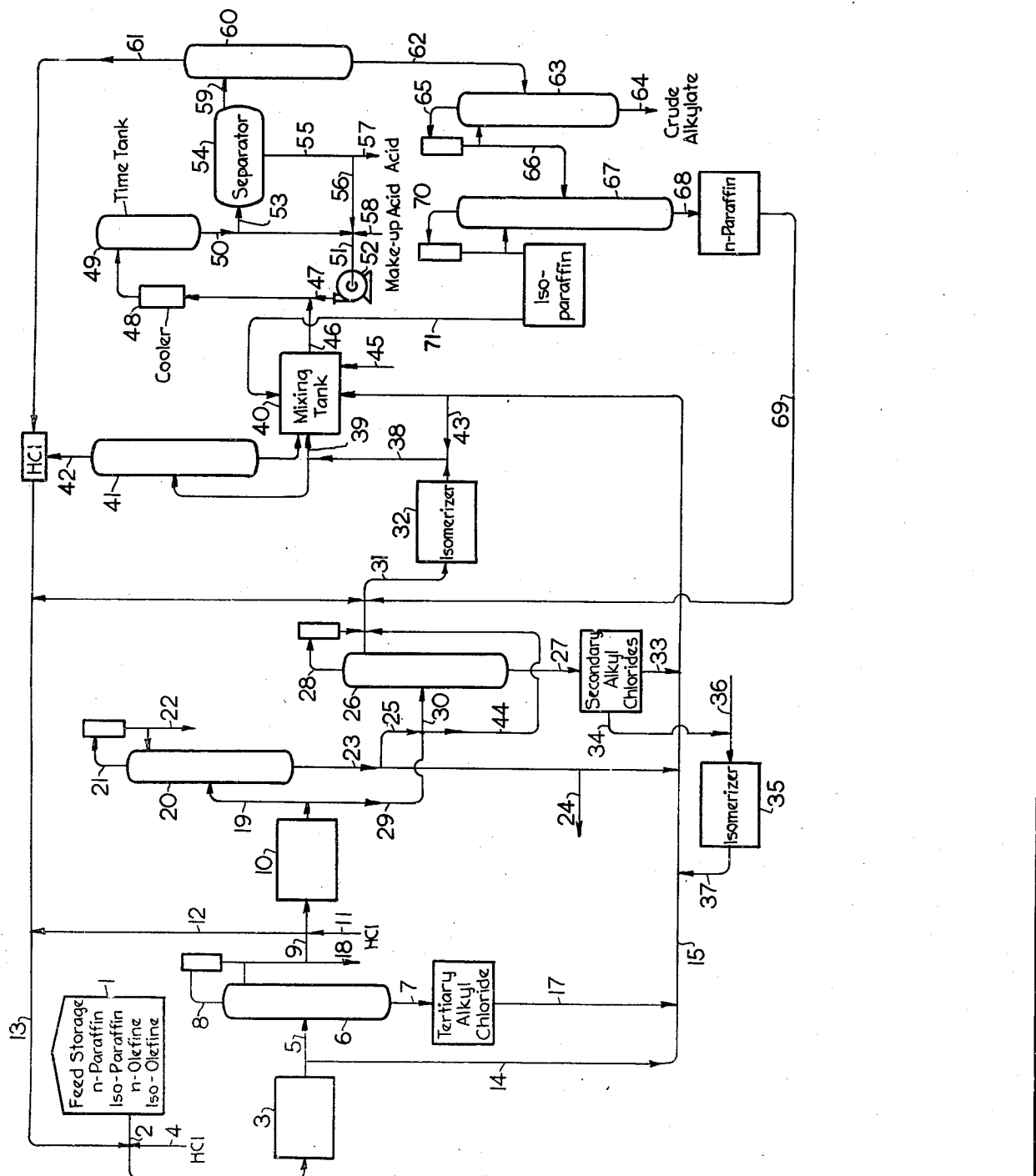
Inventor: Seaver A. Ballard
By his Attorney: Millard L. Caldwell Patented Mar. 12, 1946

2,396,486

UNITED STATES PATENT OFFICE 2,396,486

PARAFFIN ALKYLATION PROCESS

Seaver A. Ballard, Berkeley, Calif., assignor to Shell Development Company, San Francisco, Calif., a corporation of Delaware Application September 5, 1940, Serial No. 355,440

17 Claims. (Cl. 260—683.4)

This invention relates to the production of saturated hydrocarbons, particularly branched chain saturated hydrocarbons suitable for use as constituents of motor fuels of high anti-knock value. It deals with an improved method of producing such hydrocarbons by alkylation of open or closed chain paraffins, preferably having a tertiary carbon atom in the molecule.

An important object of the invention is to increase the life of sulphuric or halosulphonic acids used as catalysts for the alkylation of paraffins which catalysts will be hereinafter referred to generically as sulphur acid alkylation catalysts. Another object is to improve the yield and quality of the alkylation products obtainable from isoparaffins. Still another object is to reduce the cost of such alkylations by reducing the proportion of isoparaffin which it is necessary to maintain in the reaction mixture. It is also an object of the invention to provide a process of improved selectivity for the production of paraffins from other paraffins and olefine mixtures. Further objects and advantages of the invention will be apparent to those skilled in the art from the following description.

The alkylation of isoparaffins such as isobutane, isopentane and the like by reaction with olefines, particularly normally gaseous olefins, in the presence of concentrated sulphuric acid has been widely adopted by the petroleum industry as the most advantageous available method for commercial scale production of premium fuels, especially aviation gasoline. In spite of many improvements which have been made in this process, the consumption of sulphuric acid catalyst has remained undesirably high, particularly when the more reactive olefines such as propylene and isobutylene are used as the alkylating agent. It has now been found that such alkylations may be more advantageously carried out using aliphatic halides as the alkylating agent. By using halides the alkylation acid catalyst is not as readily deactivated by absorption of organic impurities, presumably due to the fact that the halides are less reactive with the acid than are olefines. As a result, longer catalyst life is possible. Also lower ratios of isoparaffins to alkylating agent may be used with resulting economy of operation, particularly with respect to distillation expense.

The process of the invention may be applied to the alkylation of open or closed chain aliphatic hydrocarbons, particularly those containing a hydrogen atom attached to a tertiary carbon atom and suitable substitution products thereof. Thus, it may be used for the manufacture of other branched chain compounds from isobutane, isopentane, 2-methyl pentane, 2,3-dimethyl butane, 2,2,5-trimethyl hexane, 3-ethyl pentane, methyl cyclopentane, methyl cyclohexane, 1,4-dimethyl cyclohexane, 1-chloro-3-methyl butane and the like. Such saturated starting materials may be in a pure state or as a mixture of two or more such branched chain compounds or mixtures containing such a compound with other components which may or may not be inert under the reaction conditions but which do not inhibit the desired alkylation. Particularly advantageous sources of starting material for the process of the invention are hydrocarbons which may be derived from petroleum, petroleum products, shale oil, coal or other carboniferous materials. The branched chain saturated compounds present in the starting material may be of natural occurrence, the result of pyrogenetic treatment, hydrogenation, isomerization or other suitable processing. Cracked petroleum distillates or special fractions thereof, particularly hydrocarbon fractions consisting of or predominating in hydrocarbons containing the same number of carbon atoms per molecule may be used although non-isomeric mixtures such as gasoline fractions are also suitable. Such fractions or mixtures may advantageously be subjected to suitable refining for the removal of sulphur and/or nitrogen or oxygen compounds or other undesirable impurities prior to use in the process of the invention. Removal of the more reactive hydrocarbons such as aromatic and/or unsaturated hydrocarbons may also be desirable. Thus, the extraction process of United States Patent 2,114,524, for example, may be used to decrease the aromatic content of the material to be alkylated and/or olefines may be removed by extraction as described in Patents 1,893,733, 2,007,159 and 2,060,143 or by polymerization as shown in Patents 2,007,160, 2,142,980 and 2,174,247. Whether or not one or more such pretreatment of the feed stock is applied, it may be advantageous to further increase the concentration of the saturated aliphatic compound being reacted by fractionation and/or isomerization of isomeric hydrocarbons present therewith.

For the purpose of making the invention more clear it will be described in detail in connection with the use of concentrated sulphuric acid, preferably acid of 90–100% concentration, as the alkylation catalyst since its low first cost and ready availability makes this a particularly advantageous catalyst. It will be understood, however, that the invention is not limited thereto as similar, or in some cases even relatively greater, advantages may be obtained when the process is applied to alkylations carried out with other acid alkylation catalysts such as chlorosulphonic, fluorosulphonic, bromosulphonic, and hydrofluoroboric acids. Furthermore, not only may mixtures of such catalyst acids be used but also mixtures of one or more acid alkylation catalysts with other materials having a beneficial effect on the reaction, such, for example, as boron fluoride, copper and/or magnesium sulphates, the oxides of elements of group V of the periodic table, e. g. phosphorus pentoxide, an oxide of vanadium, etc., zinc or cadmium phosphates, sulphur dioxide and/or trioxide, or other suitable compounds.

The reaction may be carried out with a wide variety of halides having a halogen atom attached to an aliphatic carbon atom. Thus, open or closed chain aliphatic halides which may or may not contain aromatic or other suitable substituents in the molecule may be used. Preferred halides are those having a halogenated carbon atom attached to an aliphatic carbon atom to which a hydrogen atom is directly attached. It has been found that tertiary halides react more rapidly than secondary halides which are in turn more reactive than primary halides. Examples of preferred halides are alkyl monohalides such as isopropyl, secondary butyl, tertiary butyl, secondary isoamyl, tertiary amyl chlorides and bromides and higher homologues thereof, monohalogenated cyclic aliphatic hydrocarbons such as cyclopentyl chloride, cyclohexyl chloride, the corresponding mono and dialkyl cyclic halides and the like, unsaturated halides such as 2-chlorobutene-3, 2-chloro-2-methyl-butene-3, 2-chloropentene-4, 2-chloro-3-methyl-butene-3, 1-chlorocyclohexene-3, and the like and aralkyl halides such as 2-chloro-2-phenyl propane, 2-chloro-3-phenyl butane, 1-chloro-1-phenyl ethane, etc. It will be understood that these preferred types of halides are cited by way of illustration only and that other halides, including the analogous polyhalogenated compounds such, for example, as 2,2 dichloropropane, 1,3 dichlorobutane, 1,4 dichloropentene-1, isobutylene dichloride, 1-chloro-2-bromo-2-methyl propane, 1,4 dibromo-cyclohexane and the like may also be used and halogenated alkylation products obtained therefrom.

While the invention is not restricted with respect to the origin of the halogenated compound or compounds used therein, particularly advantageous sources of such alkylating agents are the hydrohalogenation of olefines, particularly the olefinic products of petroleum cracking and/or halosubstitution of the corresponding saturated components of such cracking products. Advantageous methods of carrying out such reactions are described in United States Patents 2,077,382 and 2,081,322. An especially useful method of halogenating paraffins is claimed in Patent 1,991,600 while efficient olefine halogenation procedures are shown in Patents 1,952,122, 2,010,389 and 2,130,084. A preferred method for adding hydrogen halides to olefines is by means of concentrated sulphuric acid catalysts as described and claimed in copending application Serial Number 321,290 filed February 28, 1940. Whether produced by the foregoing procedures or not the halides may be used in a pure state or as mixtures with other halides or with non-halogenated compounds. It is sometimes advantageous to submit the halide or halide mixture to an isomerization treatment prior to its use in the alkylation reaction. United States Patent 2,042,223 describes an isomerization process which may be used. Where unsaturated polyhalides are involved the rearrangement method of copending application Serial Number 303,098 filed November 6, 1939 may be advantageous. A preferred procedure for the rearrangement of chlor-alkanes comprises reaction with suitable halides such as aluminum chloride or double compounds thereof, e. g. the so-called Gustavson complexes with alkyl aromatic compounds, nitrobenzene, etc. or boron fluoride or the like, at temperatures below 200° C., preferably between about 20° C. and 150° C. in the presence of a hydrogen halide. In this way, the less reactive primary alkyl chlorides may be converted to the more reactive secondary or tertiary halides, and α,β dichlorides such as 1,2-dichlorobutane may be changed to more reactive χ,γ dichlorides such as 1,3 dichlorobutane. In addition to, or in lieu of, shifting the chlorine atom or atoms the isomerization may be carried out so as to effect a change in the carbon skeleton of the molecule and produce branched chain alkyl chlorides from the corresponding straight chain compounds.

The temperature at which the reaction of the chosen halide and paraffin are most advantageously reacted will depend upon the nature of these reactants as well as upon the type of catalyst acid adopted and its concentration. With sulphuric acid of about 85 to 100% concentration, temperatures of the order of about 0° to 40° C. may be used, the lower temperatures being preferably employed with the more concentrated acid and the temperature being increased as the acid concentration is reduced. With halosulphonic acid catalysts lower temperatures are generally preferable. Using a mixture of equal molecular amounts of boron fluoride and water as the catalyst, it is feasible to employ somewhat higher temperatures and, in fact, such higher temperatures are particularly desirable when employing ethyl chloride or the like for the alkylation of isobutane for example.

The process may be carried out with both reactants in the vapor phase but more preferably at least the paraffin to be alkylated is maintained in the liquid phase. The preferred procedure is to maintain all reactants in the liquid state throughout the reaction. It is desirable to have a relatively large amount of liquid catalyst acid present, for example about 0.5 to 2 volumes, or preferably 0.7 to 1.3 volumes, of catalyst acid per volume of reaction mixture comprising the compound being alkylated and the alkyl halide alkylation agent, but lower proportions are feasible when using halosulphonic acids as alkylation catalyst. The use of superatmospheric pressures is generally advantageous, but normal or reduced pressures may also be used.

The reaction time should be adjusted with relation to the reactivities of the halide or halides involved so as to insure the desired amount of conversion. With highly reactive tertiary alkyl halides quite short times of contact, for example, of the order of about 5 to 30 minutes may be adequate although longer times are usually not detrimental and in some cases may be advantageous. With secondary halides contact times of about 10 to 90 minutes are preferred while still longer contact is usually desirable to insure adequate reaction of less reactive halides.

An excess of the open or closed chain paraffin being alkylated is desirable throughout the reaction. Smaller excesses may be used where less reactive halides are employed as the alkylating agent but with the more reactive tertiary and secondary alkyl halides it is preferred to carry out the reaction with at least 1.5, more preferably at least 2, mols of the paraffin being alkylated per mol of halide alkylation agent and most preferably with higher ratios of the order of 10 to 100 to 1 or higher. Such high ratios may conveniently be achieved while employing more economical feed ratios of about 2.5 to 10 mols of isoparaffin per mol of alkyl halide by feeding the preferably premixed reactants into a stream of reaction mixture circulating in a closed circuit from which a part of the mixture is continuously withdrawn to a separator in which the bulk of the alkylation catalyst acid is withdrawn and returned to the circuit as described and claimed in copending application Serial No. 276,251 filed May 27, 1939. Other methods of batch, intermittent, or continuous operation may be used.

The following illustrate applications of the invention and show how it may be carried out.

Example I

One hundred cc. of tertiary butyl chloride was added slowly to a vigorously stirred mixture of 300 cc. of isopentane and 200 cc. of 97% $H_2SO_4$. The addition required about 2 hours. Strong evolution of HCl was observed. The upper layer was distilled and from this was recovered 111 cc. of isopentane and 93 cc. of condensation product of boiling range 60–195° C. The amount of recovered tertiary butyl chloride was about 15–19 cc. The condensation product had a low bromine number and a low percentage of chlorine.

Similar reaction with isobutylene dichloride gave a chlorine-containing alkylation product of boiling range 113°–190° C.

Example II

Secondary butyl chloride was reacted with isopentane in the presence of 97–100% sulphuric acid using the same proportions of reactants and reaction conditions as were used in Example I. The saturated hydrocarbon reaction product recovered boiled between 80° and 142° C. and the volume percent yield was 96.5 based on converted secondary butyl chloride.

Substituting propylene dichloride for the secondary butyl chloride in this reaction resulted in a yield of about 42% based on the volume of dichloride unrecovered at the end of the run. The product contained chlorine and boiled between 100° and 120° C.

Example III

Isopropyl chloride and normal butyl chloride were separately reacted with isopentane as described in the foregoing examples. The products were saturated hydrocarbons having boiling ranges of 53° to 142° and 82° to 130° C. respectively. Considerable mechanical losses occurred during reaction and subsequent treatment but the recovered product from the isopropyl chloride reaction was 48% by volume of the unrecovered starting materials.

The catalyst acid layers in all the foregoing tests were found to be quite light in color at the end of the runs and dilution by pouring the acid on ice separated only very negligible amounts of organic matter. Moreover, steam distillation of the diluted acid layers yielded little if any water insoluble distillates showing that deactivation of the catalyst by absorption of hydrocarbon is much less than in corresponding reactions in which olefines are used and that very much longer catalyst acid life may be obtained by use of alkyl halide alkylating agents.

In these reactions hydrogen halide is evolved which may advantageously be recycled to produce halide for further reaction. The products are preferably treated to remove any remaining traces of alkyl chlorides as these greatly reduce the susceptibility of the alkylates to enhancement of their anti-knock value by addition of lead tetraethyl. Such impurities are preferably removed by digestion with a 5–10% sodium hydroxide solution at about 100–150° C. but treatment with Terrana or similar active earths may also be used.

The process of the invention is particularly valuable for the more complete conversion of petroleum cracking products, particularly the normally gaseous fractions thereof, to gasoline boiling components of high anti-knock value. The attached drawing illustrates, diagrammatically, a suitable arrangement of apparatus for carrying out such a process. In the drawing Figure 1 represents a storage tank for the feed to the system which will be assumed to contain as the principal components normal and isoparaffins and the corresponding normal and isoolefines together with cyclic paraffins and olefines in the case of fractions comprising compounds of five or more carbon atoms per molecule. Such cyclic aliphatic components, if present, may be reacted along with the corresponding open chain compounds so they will not be separately referred to in the following description of the process. The hydrocarbon mixture from tank 1 is fed by line 2 to a hydrochlorination unit 3 together with hydrogen chloride introduced via line 4. Several different hydrochlorination methods are available as has already been pointed out. The process may be carried out without any catalyst but more preferably the addition of HCl to the olefine or olefines to be converted is effected in the presence of ferric chloride or concentrated sulphuric acid or other suitable catalyst. Most preferably the reaction is conducted under conditions at which the tertiary olefines are selectively converted to the corresponding tertiary alkyl chlorides. The reacted mixture, after separation (by means not shown) of catalyst and/or undesired components, if necessary, is fed by line 5 to a fractionating column 6 from which the tertiary alkyl chlorides produced are withdrawn as bottom product by line 7. The overhead product taken off by line 8 will contain all the starting paraffins together with the secondary olefines and the excess hydrogen chloride. This mixture may be fed by line 9 to a second hydrochlorinator 10 in which the less reactive olefines may be converted to alkyl halides using a catalyst similar to that employed in unit 3 under more drastic conditions or employing a more active hydrohalogenation catalyst or both. Additional hydrogen chloride, if needed, may be added by line 11. In some cases it may be more advantageous to use the product from unit 3 as feed to the alkylation unit with or without separation of hydrogen chloride which may be effected in column 6 and the separated hydrogen chloride returned by lines 12 and 13 to the hydrochlorinator. Where no hydrogen chloride separation is made the entire product of hydrochlorinator 3 may be fed by lines 14 and 15 to the alkylation unit to be described hereinafter. Alternatively only the tertiary alkyl chlorides may be fed to this alkylation unit, as by lines 17 and 15, while the overhead products from column 6, with or without separation of hydrogen chloride (not shown) are conducted, by line 18, to another alkylation unit, not shown, in which alkylation with the less reactive secondary olefines is effected in the usual way. Such a procedure offers the advantage of providing longer alkylation catalyst life than if the tertiary olefines are used as alkylation agents along with the secondary olefines yet involves no loss in yield of alkylate from removal of the tertiary olefines since these are converted in the form of their chlorides. Similar advantages are obtained when the alkylation is carried out using the secondary olefines in admixture with the tertiary alkyl chlorides.

Particularly when the starting material contains low boiling paraffins or other components which may be undesirable diluents in the alkylation process, e. g. where propane and propylene are present, it is preferred to hydrochlorinate the secondary olefines as well as the tertiary olefines prior to carrying out the alkylation as the propane, ethane, etc., may then be easily separated. Thus, the products from hydrochlorinator 10 may be fed by line 19 to a fractionating column 20 in which the undesired low-boiling components may be taken off overhead by line 21 and withdrawn from the system by line 22 after separation of hydrogen chloride, where necessary, by means not shown. The bottom product containing the remaining normal- and iso-paraffins and secondary alkyl chlorides may be fed by lines 23 and 15 to the alkylation unit along with the tertiary alkyl chlorides or they may be conducted by lines 23 and 24 to a separate alkylation unit not shown. Preferably, the bottom product from column 20 is fed by lines 23, 25 and 30 to fractionating column 26 in which the alkyl chlorides are separated as a bottom product withdrawn by line 27 while the paraffins are taken off overhead by line 28. Particularly when low-boiling diluents are absent it is advantageous to by-pass column 20 and feed the reaction products from hydrochlorinator 10 by lines 29 and 30 to column 26. The separated overhead product containing normal and iso-paraffin then being fed by line 31 to isomerizer 32 contains premixed hydrogen chloride which serves to activate aluminum chloride type isomerization catalysts.

The separated secondary alkyl chlorides may be passed by lines 33 and 15 to the alkylation unit or more preferably may be conducted by line 34 to isomerizer 35 in which they are contacted with aluminum chloride or other suitable isomerization catalyst under conditions at which the alkyl chlorides are rearranged to more active forms, e. g. secondary chlorides are converted to tertiary chlorides. Hydrogen chloride or other suitable activator for the isomerization may be introduced by line 36. The isomerized product is returned by line 37 to line 15 feeding to the alkylation unit. The alkyl chlorides may, however, be conducted by lines 29 and 44 or 25 and 44 to isomerizer 32 along with the paraffin components.

In isomerizer 32 the concentration of the isoparaffin or iso-paraffins is increased, most preferably by isomerizing the normal paraffins in the presence of a promoted aluminum halide catalyst such, for example, as Gustavson complexes of aluminum chloride with various organic compounds such as acids, ethers, esters, hydrocarbons, etc., or those of the metal double-salt type in which the aluminum chloride is in loose combination with a halide of another metal, for instance, a halide of antimony, tin, zirconium, copper, titanium, one or more alkali metals and the like. Suitable means for carrying out such an isomerization are described in copending application Serial No. 339,732 filed June 10, 1940 and isomerizer 32 preferably represents an assemblage of apparatus such as the isomerization unit shown therein although other suitable types of apparatus may be employed. The treated mixture is then fed by lines 38 and 39 to tank 40 in which the feed to the alkylation unit is premixed. If desired, hydrogen chloride may be first separated in column 41 and returned by lines 42 and 13 to the hydrochlorinator. Where such separation is considered desirable, line 43 may be used to conduct hydrogen chloride-containing alkyl chlorides in line 15 to column 41 instead of directly to mixing tank 40. Also normal paraffins may be separated from isoparaffins either before or after isomerizer 32 or both, but such separations are not shown in the drawing.

The premixed feed to the alkylation unit comprising isoparaffin, including, if desired, isoparaffin from an outside source which may be introduced by line 45, and alkyl chlorides with or without olefines less reactive than tertiary olefines, are fed by line 46 into a stream of a thoroughly dispersed emulsion of concentrated sulphuric acid and reaction mixture circulating in a closed circuit through conduit 47, cooler 48, time tank 49, lines 50 and 51 and circulating pump 52. From this circulating stream a part of the reaction mixture is withdrawn, preferably continuously, by line 53 to decantation tank 54 from which the separated acid phase is taken off by line 55 and a part returned to the circuit by line 56. The remainder of the acid may be withdrawn by line 57 and replaced by fresh catalyst added by line 58.

The separated hydrocarbon phase is taken off by line 59 and the contained hydrogen chloride formed in the reaction flashed off in column 60 and returned by lines 61 and 13 to the hydrochlorination. The remaining hydrocarbons are fed by line 62 to column 63 in which the alkylation products are recovered as bottoms by line 64 while the overhead products are conducted by lines 65 and 66 to fractionating column 67. In column 67 normal paraffins may be separated as bottom product and returned via lines 68 and 69 to line 31 feeding to isomerizer 32. The recovered isoparaffins are then taken off by line 70 and conducted by line 71 to tank 40 for reuse in the alkylation.

It will be apparent that the invention is capable of wide variation not only with respect to the open and closed chain paraffins which may be alkylated and the halides which may be reacted therewith but also in regard to the method of operation which may be applied. For example, while separate hydrochlorination of tertiary and less reactive olefines is shown in the example illustrated in the drawing, it is possible to carry out these steps in the same unit. Furthermore, although alkylation with the entire alkyl halide content of an alkyl halide mixture has been emphasized in the foregoing, this is by no means always desirable since the differences in reactivities of the different alkyl halides may be utilized for selective alkylation with one or more components of such mixtures. Thus the process of the invention may be used for the purification of primary alkyl halides by reacting the more reactive secondary and/or tertiary halides present therewith with an isoparaffin in the presence of sulphuric acid. Such selective alkylation procedure may be advantageous even where ultimate alkylation with all of the halides is desired since the less reactive halides may be separated and subjected to suitable isomerization, and then returned to the alkylation unit. Still other variations of the process may be carried out and it will, therefore, be understood that the invention is not limited to the details disclosed by way of illustration and example nor by any theory suggested in explanation of the improved results obtained but only by the accompanying claims.

I claim as my invention:

1. In a process of producing a saturated hydrocarbon boiling in the gasoline range from isobutane and a normally gaseous olefine having at least three carbon atoms per molecule, the steps of converting said olefine to the corresponding alkyl monochloride and contacting isobutane and said chloride in a molar ratio of at least two to one in the presence of sulphuric acid of 90% to 100% concentration at a temperature of 10° to 30° C. at which alkylation of the isobutane by said chloride takes place and a hydrocarbon is produced.

2. In a process of producing a saturated hydrocarbon boiling in the gasoline range from an isoparaffin and a mixture of normally gaseous secondary and tertiary olefines, the steps of reacting at least the tertiary olefine content of said mixture with hydrogen chloride to form the corresponding tertiary alkyl chloride and contacting said isoparaffin and chloride in the presence of concentrated sulphuric acid at a temperature of 10° to 30° C. at which alkylation of said isoparaffin by said chloride takes place and a hydrocarbon is produced.

3. In a process of producing a saturated hydrocarbon from an isoparaffin and a mixture of olefines, the steps of reacting the more reactive of said olefines with hydrogen chloride and contacting the resulting alkyl chloride and less reactive olefine with said isoparaffin in the presence of concentrated sulphuric acid under conditions at which alkylation of said isoparaffin by said alkyl chloride takes place and a hydrocarbon is produced.

4. A process of alkylating an isoparaffin having not more than six carbon atoms per molecule comprising reacting said saturated hydrocarbon with a tertiary alkyl chloride in the presence of concentrated sulphuric acid under conditions at which alkylation of said isoparaffin by said alkyl chloride takes place.

5. A process of alkylating a saturated hydrocarbon having a tertiary carbon atom comprising reacting said saturated hydrocarbon with a tertiary alkyl chloride in the presence of concentrated sulphuric acid under conditions at which alkylation of said isoparaffin by said alkyl chloride takes place.

6. A process of alkylating a saturated hydrocarbon having a tertiary carbon atom comprising reacting said saturated hydrocarbon with a secondary alkyl chloride in the presence of concentrated sulphuric acid under conditions at which alkylation of said saturated hydrocarbon by said alkyl chloride takes place.

7. A process of alkylating a saturated hydrocarbon having a tertiary carbon atom comprising reacting said saturated hydrocarbon with an alkyl monohalide in the presence of concentrated sulphuric acid under conditions at which alkylation of said saturated hydrocarbon by said alkyl halide takes place and a hydrocarbon is produced.

8. A process of alkylating a saturated hydrocarbon having a tertiary carbon atom comprising reacting said saturated hydrocarbon with an alkyl halide in the presence of a sulphuric acid alkylation catalyst under conditions at which alkylation of said saturated hydrocarbon by said halide takes place.

9. A process of alkylating a saturated hydrocarbon having a tertiary carbon atom comprising reacting said saturated hydrocarbon with a halide having a halogenated aliphatic carbon atom directly joined to an aliphatic carbon atom to which a hydrogen atom is attached in the presence of a sulphuric acid alkylation catalyst under conditions at which alkylation of said saturated hydrocarbon by said halide takes place.

10. A process of alkylating a saturated hydrocarbon having a tertiary carbon atom comprising reacting said saturated hydrocarbon with a halide having a halogenated aliphatic carbon atom in the presence of an acid alkylation catalyst under conditions at which alkylation of said saturated hydrocarbon by said halide takes place.

11. A process of purifying a mixture of a primary alkyl halide and a tertiary alkyl halide which comprises reacting said mixture with an isoparaffin in the presence of concentrated sulphuric acid under conditions at which alkylation of said isoparaffin by said tertiary alkyl halide takes place.

12. A process for the production of higher boiling hydrocarbons from low boiling saturated hydrocarbons having a tertiary carbon atom comprising the step of subjecting said low boiling saturated hydrocarbons and an alkyl halide selected from the group consisting of secondary and tertiary alkyl halides to the action of strong sulfuric acid alkylation catalyst.

13. In a process for the production of paraffin hydrocarbons of relatively high molecular weight from paraffin hydrocarbons of lower molecular weight, the steps which comprise establishing an intimate admixture of an isoparaffin in liquid phase, an alkyl halide in the liquid phase, selected from the group consisting of secondary and tertiary alkyl halides and having not more than five carbon atoms per molecule, and sulfuric acid having a strength of 90% to 100% by weight, maintaining said intimate mixture at a suitable reaction temperature for a period of time sufficient to effect a reaction of isoparaffin and alkyl halide to form isoparaffins of high molecular weight, and subsequently separating from the reaction mixture a hydrocarbon fraction containing isoparaffins of high molecular weight so formed.

14. The process according to claim 13 in which the alkyl halide is tertiary butyl chloride.

15. In a process of alkylating paraffins to form other paraffins of higher molecular weight, the step which comprises inter-reacting an alkylatable paraffin hydrocarbon and an alkyl halide in the presence of concentrated sulfuric acid as the alkylation catalyst to form a paraffin hydrocarbon of higher molecular weight.

16. In a process of alkylating paraffins to form other paraffins of higher molecular weight, the step which comprises inter-reacting an alkylatable paraffin hydrocarbon and a low-boiling tertiary alkyl halide in the presence of concentrated sulfuric acid as the alkylating catalyst to form a paraffin hydrocarbon of higher molecular weight.

17. In a process of alkylating paraffins to form other paraffins of higher molecular weight, the step which comprises inter-reacting an alkylatable paraffin hydrocarbon and an alkyl chloride in the presence of concentrated sulfuric acid as the alkylating catalyst to form a paraffin hydrocarbon of higher molecular weight.

SEAVER A. BALLARD.